Figure 1:
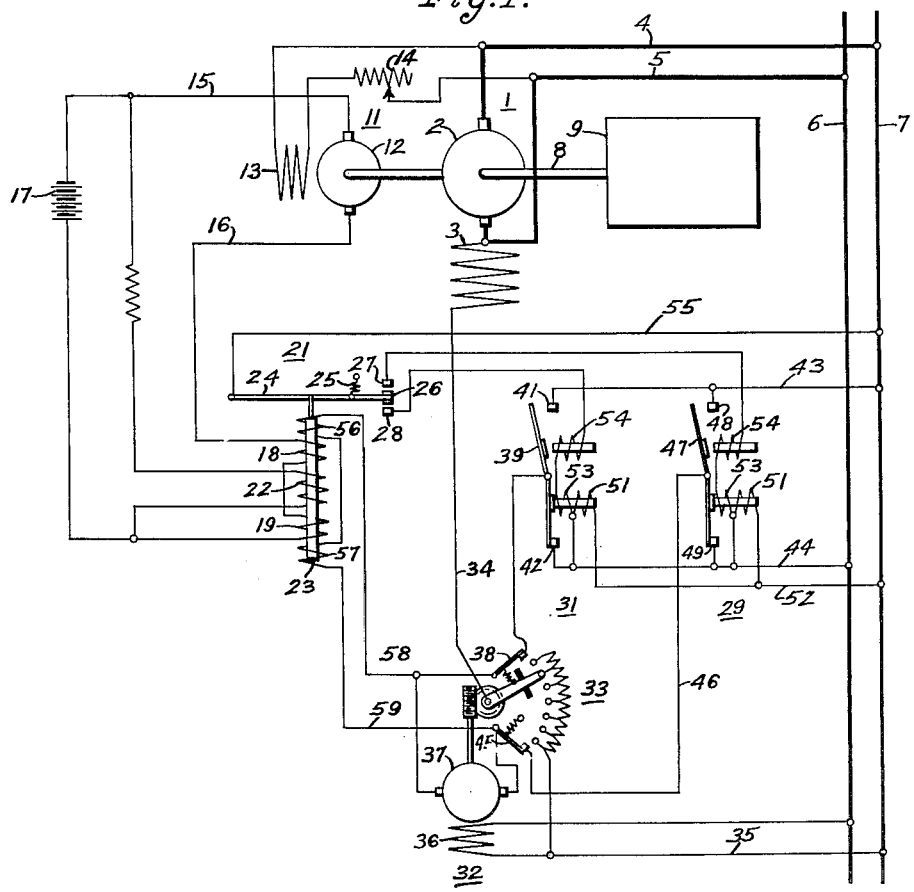

March 18, 1930.  J. H. ASHBAUGH  1,751,225
REGULATOR SYSTEM
Filed Dec. 9, 1927

INVENTOR
John H. Ashbaugh
ATTORNEY

Patented Mar. 18, 1930

1,751,225

UNITED STATES PATENT OFFICE

JOHN H. ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed December 9, 1927. Serial No. 238,808.

My invention relates to regulator systems, and is especially adapted for regulating the field excitation in a dynamo-electric machine in accordance with a characteristic of the machine.

An object of my invention is to provide a regulator system of the above indicated character that is rugged in construction, and simple and accurate in its operation.

My invention may be utilized in governing the speed of a dynamo-electric machine operating as a motor, and is illustrated and described in this capacity although it will be obvious to those skilled in the art that my system is not limited to this application, but may be utilized to control other characteristics of a dynamo-electric machine, such as the voltage of a generator.

In a regulator system constructed in accordance with my invention, two sources of electric energy are provided connected in a loop circuit in voltage opposition. One of these sources of energy is arranged to vary in potential in accordance with the quantity regulated, and the potential of this source is a measure of the regulated quantity and may, therefore, be termed the regulated source. The other of said sources of electric energy has a potential, the value of which is a measure of the desired value of the regulated quantity, and it may be termed a standard or regulating source to which the regulated source is compared.

A regulator is connected in the loop circuit connecting the two sources of energy and is actuated in accordance with voltage variations of the sources as determined by the direction of current flow through the loop circuit. As the voltage of the regulated source varies above or below that of the standard source, the regulator is actuated in the one, or in the other, direction to vary the field excitation of the regulated machine in the proper direction. When the voltage of the regulated source corresponds to that of the standard source, no current will flow through the loop circuit since the two sources are connected in voltage opposition and their voltage values are equal. This condition corresponds to the desired value of the regulated quantity, or that condition in which the regulator is not required to alter the field excitation of the regulated machine.

I preferably employ a contact making regulator comprising a movable core armature which is controlled by three stationary coils. Two of the coils are differentially related, are connected in series circuit relation with each other, and are disposed near the ends of the movable armature. The core armature which is located within the three coils is polarized by the third or middle coil so that it is operated in accordance with the direction of current flow through the two differentially related coils. The middle coil is centrally located with respect to the core armature and can produce no movement of the core armature without the aid of the differentially related coils. The differentially related coils are symmetrically located with respect to the core armature and produce magnetic fluxes that are equal and opposite in direction. It is, therefore, apparent that these coils can effect no movement of the core member without the aid of the middle or polarized winding. When the three coils are simultaneously energized, the magnetic field produced by the central winding cooperates with the magnetic fields produced by the two differentially related windings for moving the core armature in a direction determined in accordance with the direction of current flow through the coils. The direction of movement of the core armature may be changed by reversing the direction of current flow through either the central coil or through the differentially related coils.

If it is desired to regulate the dynamo-electric machine to maintain the regulated quantity at a constant value, the standard source of electric energy will be a source of constant potential. If it is desired to regulate the dynamo-electric machine to follow a variable quantity, such as to regulate the speed of a motor to follow the speed variations of another motor, the voltage of the standard source of electric energy will be required to vary in accordance with the speed of the motor which is to control that of the regulated motor.

My invention will be better understood by reference to the accompanying drawing, in which, Figure 1 is a diagrammatic showing of circuits and apparatus constructed in accordance with one modification of my invention, wherein the motor is regulated to maintain a constant speed.

Figure 2:
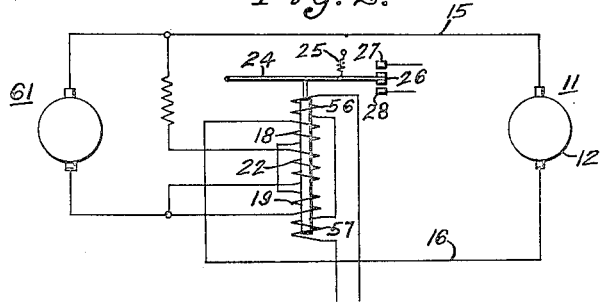

Fig. 2 is a diagrammatic showing of a portion of the regulator system, wherein the regulated motor follows the speed variations of another motor or prime mover.

Referring to the drawing, a motor 1 is provided having an armature winding 2 and a field winding 3. The armature winding is connected by means of conductors 4 and 5 to a source of energy represented by the supply conductors 6 and 7. A pilot or tachometer generator 11 is provided which is actuated in accordance with the speed of the motor 1, and produces a voltage that varies in accordance with the motor speed. The pilot generator 11 is provided with an armature winding 12 and a field winding 13 that is connected through an adjusting rheostat 14 and by means of the conductors 4 and 5 to the supply conductors 6 and 7. The armature winding 12 of the tachometer generator 11 is connected in a loop circuit, comprising the conductors 15 and 16, in voltage opposition with a battery 17 having a constant potential.

The loop circuit connecting the tachometer generator 11 and the battery 17 includes differentially related windings 18 and 19 of a contact-making regulator 21. A third winding 22 is provided and is disposed between the windings 18 and 19, the three windings being symmetrically disposed with respect to a movable core armature 23 passing through the coils and connected to a lever 24. The winding 22 is energized from any suitable unidirectional source of energy and may be connected as illustrated in parallel circuit relation with the generator 11 and the battery 17. A biasing means 25 is provided and connected to the lever 24 for overcoming the weight of the core member 23 so that it will normally remain in its neutral or illustrated position when the windings of the regulator are not energized. The lever 24 carries a movable contact member 26 that is adapted to engage the one or the other of two fixed contact members 27 or 28.

Engagement of the movable contact member 26 with one of the contact members 27 or 28 causes the operation of one of two reversing switches 29 or 31, to control a pilot motor 32, which operates a rheostat 33 connected in the field winding circuit of the motor 1. This circuit may be traced from the supply conductor 6 through conductor 5, field winding 3, conductor 34, rheostat 33 and conductor 35 to the supply conductor 7.

The pilot motor 32 comprises a field winding 36, and an armature winding 37, one side of which is connected through a rheostat limit switch 38, the movable contact-making arm 39 of the reversing switch 31, one of the contact members 41 or 42, and one of the conductors 43 or 44 to one of the supply conductors 7 or 6, respectively. The other side of the armature winding of the pilot motor is connected through a rheostat limit switch 45, conductor 46, the movable contact-making arm 47 of the reversing switch 29, one of the contact members 48 or 49, and one of the conductors 43 or 44 to one of the supply conductors 7 and 6, respectively.

Each of the reversing switches 29 and 31 are provided with two electromagnets, the lower one of them comprising a holding coil 51 that is connected by means of the conductors 44 and 52 to the supply conductors 6 and 7 and disposed to bias the switch contact-making arms 39 and 47 to the illustrated positions, short circuiting the armature of the pilot motor through the conductor 44 to effect dynamic braking. The lower electromagnet of each reversing switch is also provided with a winding 53 that is differentially related with respect to the winding 51, and is connected in series circuit relation with an operating winding 54 of the other electromagnet.

Upon engagement of the movable contact member 26 with one of the contact members 27 and 28, a circuit is completed from the supply conductor 7, through conductor 55, the regulator contact members, windings 54 and 53 of one of the reversing switches, and conductor 44, to the supply conductor 6. The energization of the winding 53 on the lower electromagnet neutralizes the flux normally produced by the winding 51, thus deenergizing the lower magnet, and the winding 54 in series circuit relation with the winding 53 actuates the contact making arm of the switch to close a circuit through the upper contact member 41, or 48, of the switches 31, or 29, respectively.

The modification of the invention illustrated in Fig. 2 of the drawing corresponds to that illustrated in Fig. 1 with the exception that a tachometer generator 61 is provided in place of the constant-potential source 17. When it is desired to regulate the speed of the motor 1 to follow the speed of a second motor, the tachometer generator 61 is driven in accordance with the speed of the second motor.

The operation of the system is as follows: The speed of the motor 1 is controlled by the operation of the field rheostat 33, by the rheostat motor 32 which is controlled by the reversing switches 31 and 29 in accordance with the operation of the regulator 21. The winding 22 of the regulator 21 is normally energized, and is effective to hold the core armature 23 in its mid or illustrated position. If the speed of the motor 1 increases above the desired value, the voltage of the tachometer generator 11 will rise above that of the battery 17 causing current to flow through the loop circuit comprising conductors 15 and 16, and the regulator windings 18 and 19 in a given direction.

Since the two windings 18 and 19 are connected so as to produce fluxes in opposite directions, the flux produced by one of these coils will oppose the flux produced by the winding 22 and move the point of greatest flux density along the axis of the core armature 23 and cause the latter to be actuated in the same direction. If the speed of the motor 1 falls below its desired value, current will flow from the battery 17, or from the tachometer generator 11, toward the tachometer generator 11, traversing the windings 18 and 19 in the opposite direction. The relation of the flux produced by the three coils 18, 19 and 22 will be to move the point of greatest flux distribution in the opposite direction along the axis of the core armature 23, thus actuating the regulator 21 to control the field rheostat 33 to increase the motor speed.

Anti-hunting means may be provided to prevent the motor speed from swinging above and below the desired value. I have illustrated an anti-hunting device comprising differentially related windings 56 and 57, symmetrically disposed about the core 23 of the regulator, and connected, by means of conductors 58 and 59, in parallel circuit relation to the armature winding of the pilot motor 32. When the armature winding of the motor 32 is energized in the one or the other direction, depending upon the operation of one of the reversing switches 29 or 31 to the other than its illustrative position, to complete a circuit in the one or the other direction through the motor armature, a circuit will likewise be completed through the anti-hunting coils 56 and 57 in the one or the other direction. The two fluxes produced by the differentially related windings 56 and 57 is similar in function to that produced by the differentially related windings 18 and 19; that is to say, they cause the point of greatest flux density to be moved along the axis of the core armature 23. The direction of the flux movement caused by the windings 56 and 57 is in a direction opposite to that caused by the windings 18 and 19, so that the contact member 26 is caused to disengage the cooperating contact member 27 or 28, prior to a return of the system to the balanced condition.

The winding 22 may be energized from any suitable direct current source, such as a battery, independently of the loop circuit comprising the regulated and standard sources of electric energy. It will also be obvious that the loop circuit of the two sources of energy may be connected in series circuit relation either with the windings 18 and 19 of the regulator, or with the winding 22 of the regulator, the other of these two circuits being continually energized in a given direction from any suitable source.

Since modifications may be made in the circuits and apparatus described to illustrate my invention, without departing from the spirit thereof, I do not wish to be limited otherwise than by the scope of the appended claims.

I claim as my invention:

1. In a regulator system, a dynamo-electric machine having a field winding, means for governing the excitation of said dynamo-electric machine comprising a source of electric energy having a potential that varies in accordance with the regulated quantity of said machine, a second source of electric energy, a circuit for connecting said two sources of energy in voltage opposition and a regulator comprising a magnet having a movable core member and three fixed coils wound about said core member, means for energizing the middle one of said coils for magnetizing the core member and for normally holding said core member centrally thereof, means for energizing the remaining two coils for varying the position of the maximum flux density with respect to the position of the coils in accordance with the direction of current flow between said two sources.

2. In a regulator system, a dynamo-electric machine having a field winding, means for governing the excitation of said dynamo-electric machine comprising a source of electric energy having a potential that varies in accordance with the regulated quantity of said machine, a second source of electric energy, a circuit for connecting said two sources of energy in voltage opposition, and a regulator comprising a magnet having a movable core member and three windings associated therewith, one of said windings being continuously energized in a given direction and two of said windings being differentially connected and energized in accordance with the direction of current flow between said two sources of energy to actuate said core member in accordance with the direction of current flow therethrough.

3. In a regulator system, a dynamo-electric machine having a field winding, means for governing the excitation of said dynamo-electric machine comprising a source of electric energy having a potential that varies in accordance with the regulated quantity of said machine, a second source of electric energy, a circuit for connecting said two sources of energy in voltage opposition, and a regulator comprising a magnet having a movable core member and three windings associated therewith and connected in two circuits, two of said windings being differentially connected in one of said circuits and disposed toward the ends of said core member, and means for energizing the circuits of said windings respectively in accordance with the voltage and current in the circuit connecting the two sources of energy.

4. In a regulator system, a dynamo-electric machine having a field winding, means for governing the excitation of said dynamo-electric machine comprising a source of electric energy having a potential that varies in accordance with the regulated quantity of said machine, a second source of electric energy, a circuit for connecting said two sources of energy in voltage opposition, and a regulator comprising a magnet having a movable core member and two circuits for energizing said core, one of said circuits comprising a magnet winding that is continually energized in a given direction, the other of said circuits comprising a magnet winding that is energized in accordance with the differential voltages of said two sources of energy.

5. In a regulator system, a dynamo-electric machine having a field winding, a circuit for energizing said field winding, a source of electric energy having a potential that varies in accordance with the regulated quantity of said machine, a second source of electric energy, a circuit for connecting said two sources of energy in voltage opposition, a regulator comprising a magnet having a core member actuated in accordance with the difference in potential between said two sources of electric energy, a motor controlled by said regulator for operating a rheostat in the field winding circuit of said dynamo-electric machine, and anti-hunting means for said regulator.

6. In a regulator system, a dynamo-electric machine having a field winding, a circuit for energizing said field winding, a source of electric energy having a potential that varies in accordance with the regulated quantity of said machine, a second source of electric energy, a circuit for connecting said two sources of energy in voltage opposition, a regulator comprising a magnet having a core member actuated in accordance with the difference in potential between said two sources of electric energy, a motor controlled by said regulator for operating a rheostat in the field winding circuit of said dynamo-electric machine, and anti-hunting means for said regulator, said anti-hunting means comprising two windings for said regulator magnet connected differentially to said electric motor.

In testimony whereof, I have hereunto subscribed my name this 3rd day of December, 1927.

JOHN H. ASHBAUGH.